(12) United States Patent
Lumpkin et al.

(10) Patent No.: US 8,746,063 B1
(45) Date of Patent: Jun. 10, 2014

(54) APPARATUS AND METHOD FOR UTILIZING FOOD RESIDUE

(76) Inventors: Anthony Paul Lumpkin, Southside, AL (US); Jeffrey Gerard Gross, Melbourne, FL (US)

( * ) Notice: Subject to any disclaimer, the term of this patent is extended or adjusted under 35 U.S.C. 154(b) by 201 days.

(21) Appl. No.: 13/348,714

(22) Filed: Jan. 12, 2012

Related U.S. Application Data

(60) Provisional application No. 61/461,866, filed on Jan. 24, 2011.

(51) Int. Cl.
*G01F 19/00* (2006.01)

(52) U.S. Cl.
USPC .......................... 73/426; 206/315.1; 220/4.26

(58) Field of Classification Search
USPC ............ 73/426, 429; 232/1 R; 220/4.01, 4.26
See application file for complete search history.

(56) References Cited

U.S. PATENT DOCUMENTS

| | | | |
|---|---|---|---|
| 809,091 A * | 1/1906 | Cain ................................ | 73/429 |
| 810,799 A * | 1/1906 | Page ................................ | 73/429 |
| 5,233,520 A * | 8/1993 | Kretsch et al. ................ | 600/300 |
| 2004/0262306 A1* | 12/2004 | Smith .......................... | 220/4.26 |

FOREIGN PATENT DOCUMENTS

| | | | |
|---|---|---|---|
| EP | 106720 A1 | * | 4/1984 |
| JP | 2003121238 A | * | 4/2003 |

OTHER PUBLICATIONS

Translation of Bibliographic Data and Description of Drawings for JP 2003-121238 by JPO and the Industrial Property Digital Library (IPDL), Date of publication of application: Apr. 23, 2003, Translated pp. 2.*
Translation of Bibliographic Data for EP0106720 by Espacenet, European Patent Office, Date of publication of application: Apr. 25, 1984, Translated pp. 1.*

* cited by examiner

*Primary Examiner* — Lisa Caputo
*Assistant Examiner* — Roger Hernandez-Prewit
(74) *Attorney, Agent, or Firm* — Ted Masters

(57) ABSTRACT

Apparatus for utilizing food residue includes a base which has a connective member. A food residue-receiving container having a first end and an opposite second end is selectively connectable to the connective member, so that the food residue-receiving container is perpendicular to the base. Food residue is deposited into the food residue-receiving container, and the height of the food residue is measured.

4 Claims, 19 Drawing Sheets

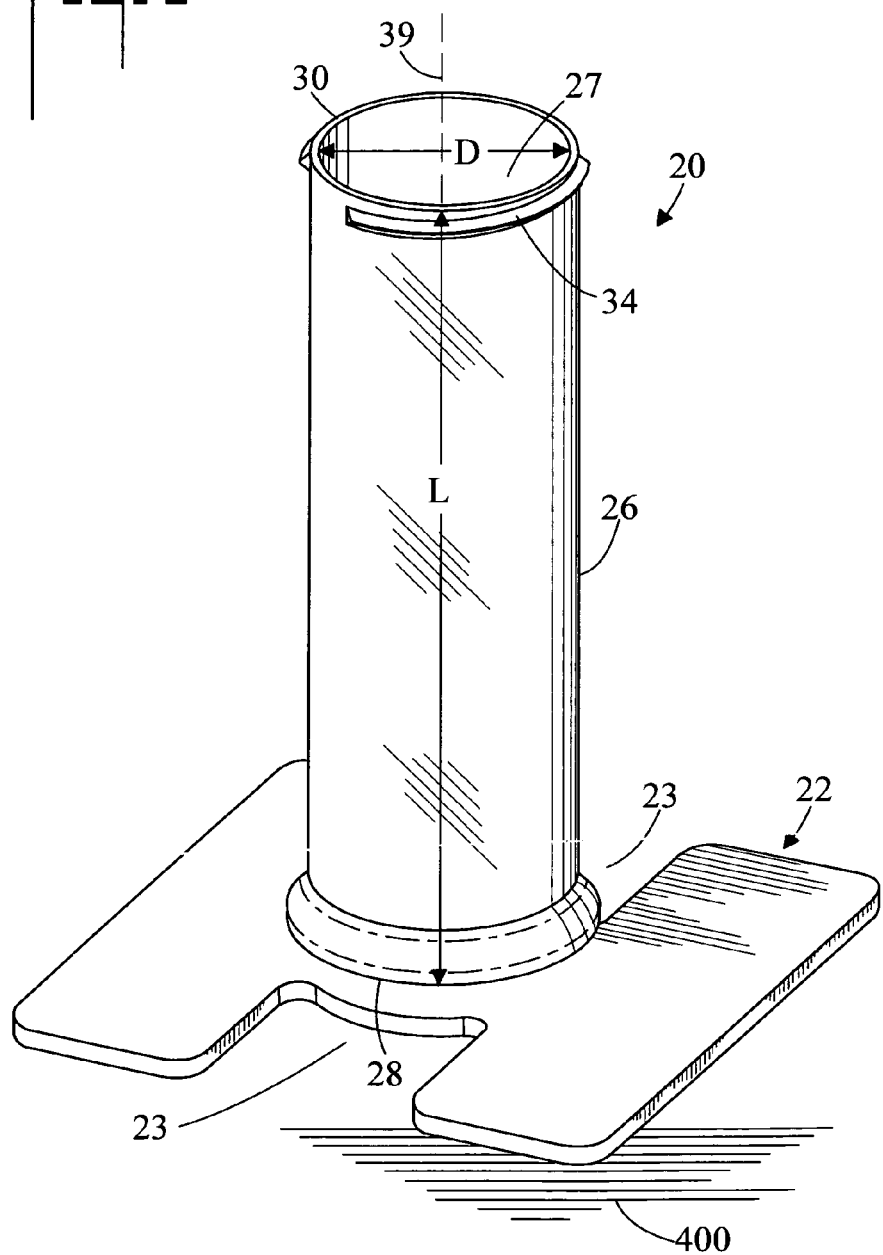

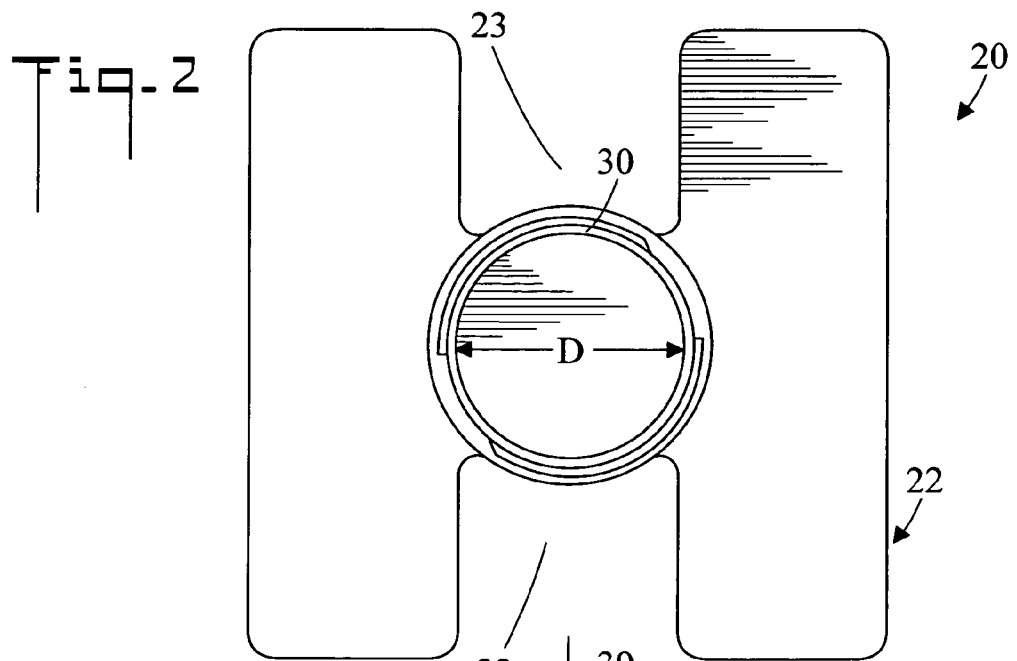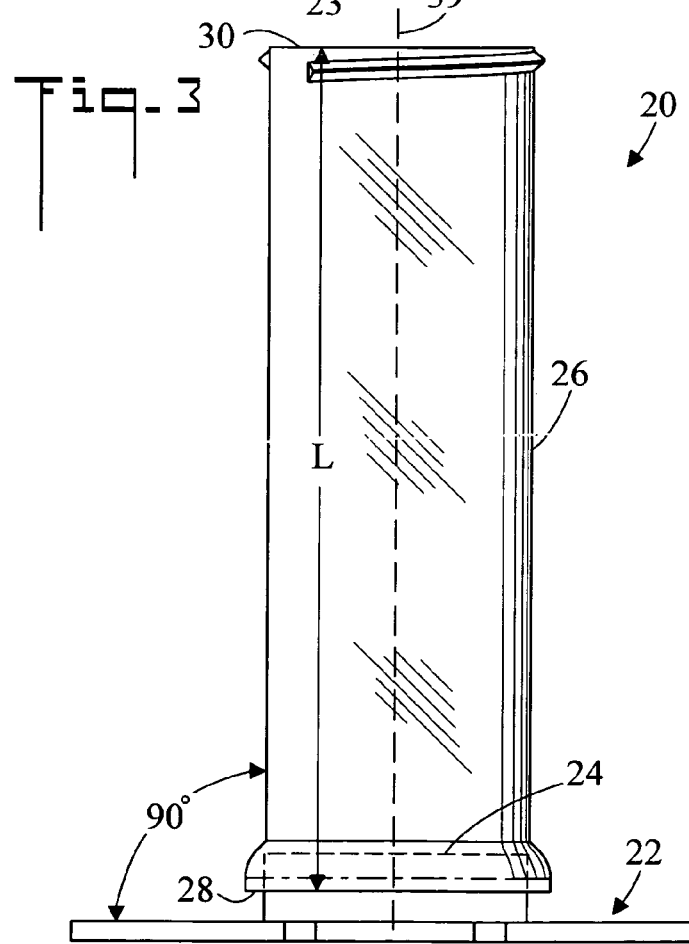

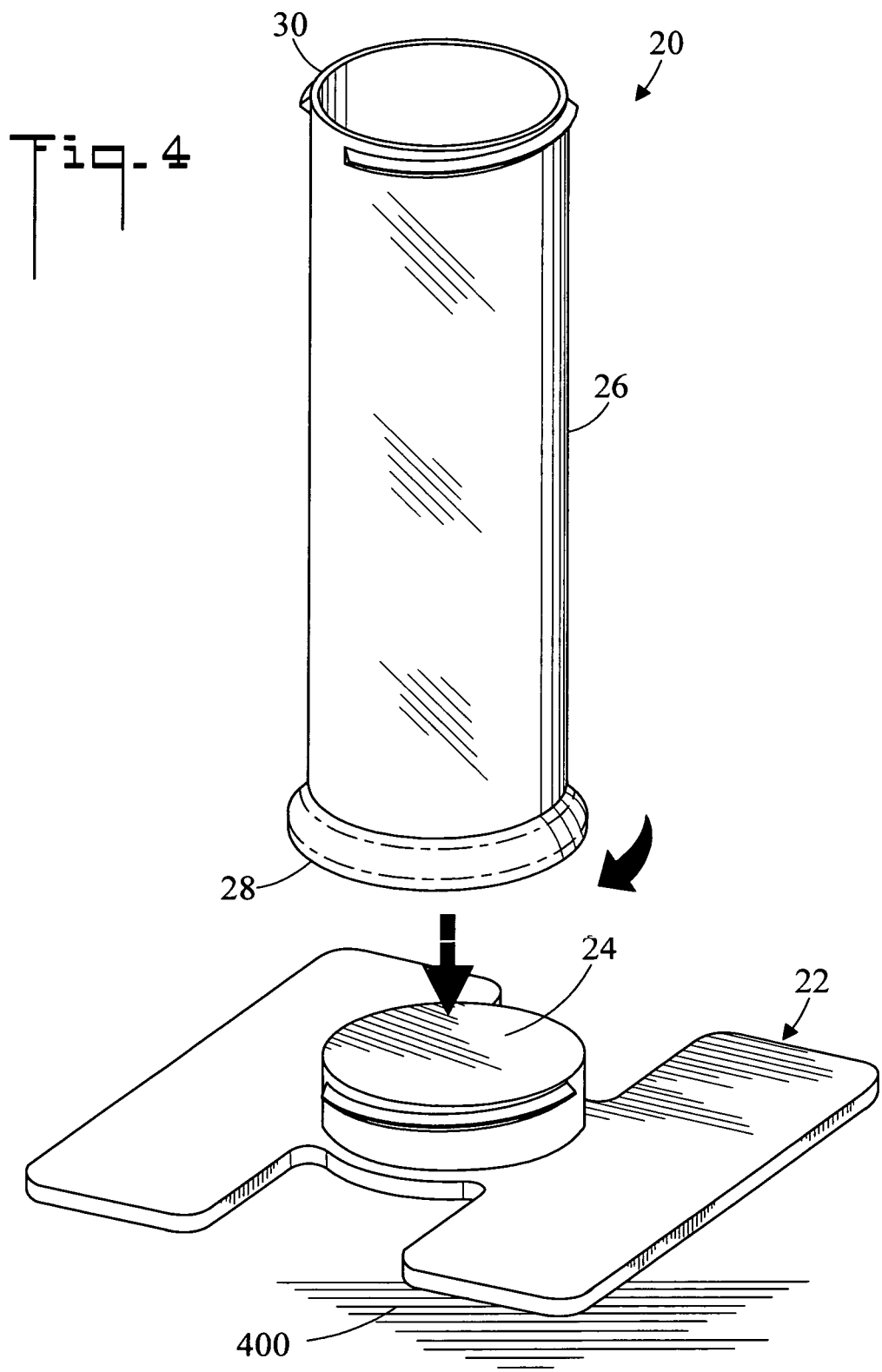

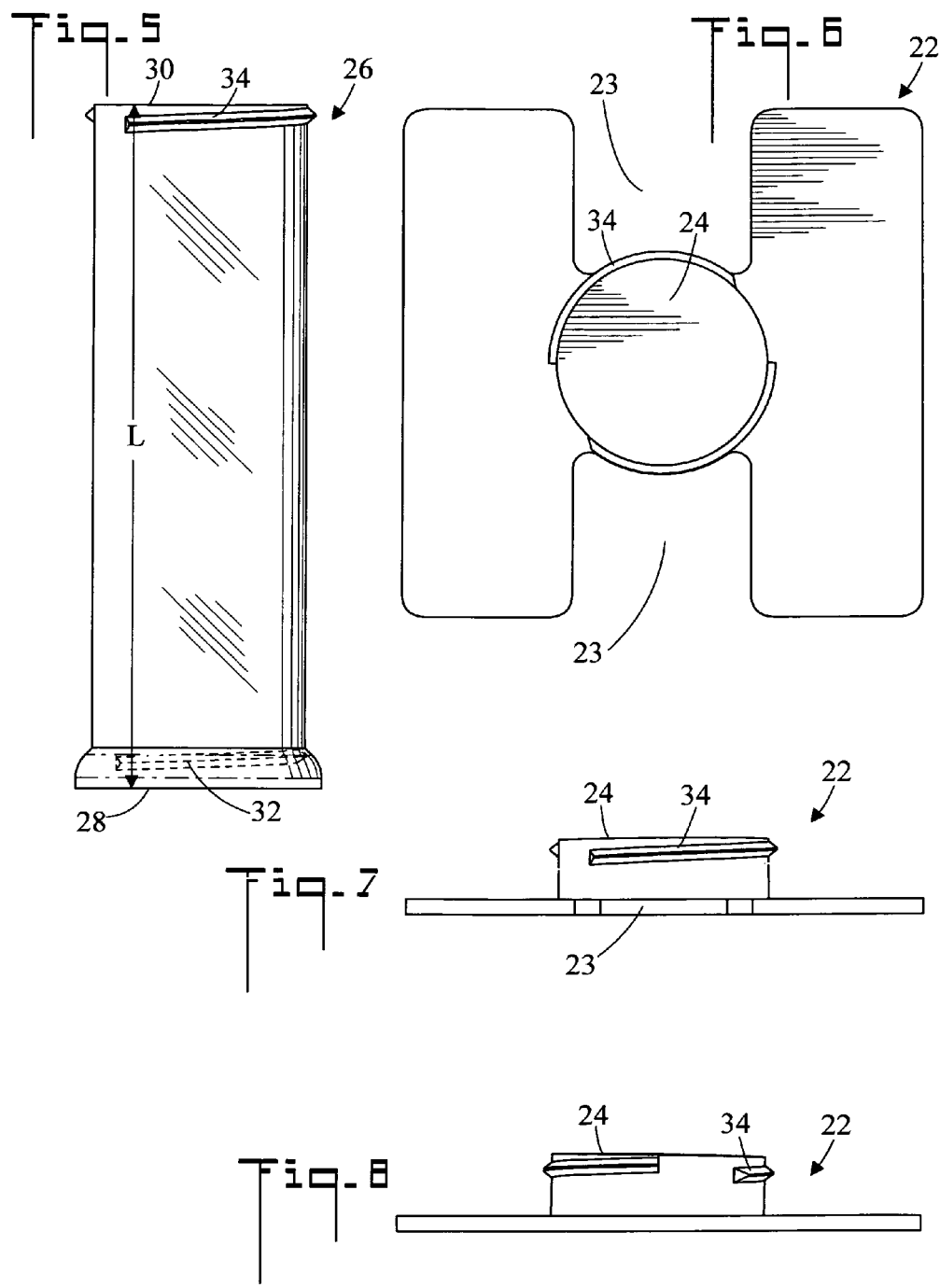

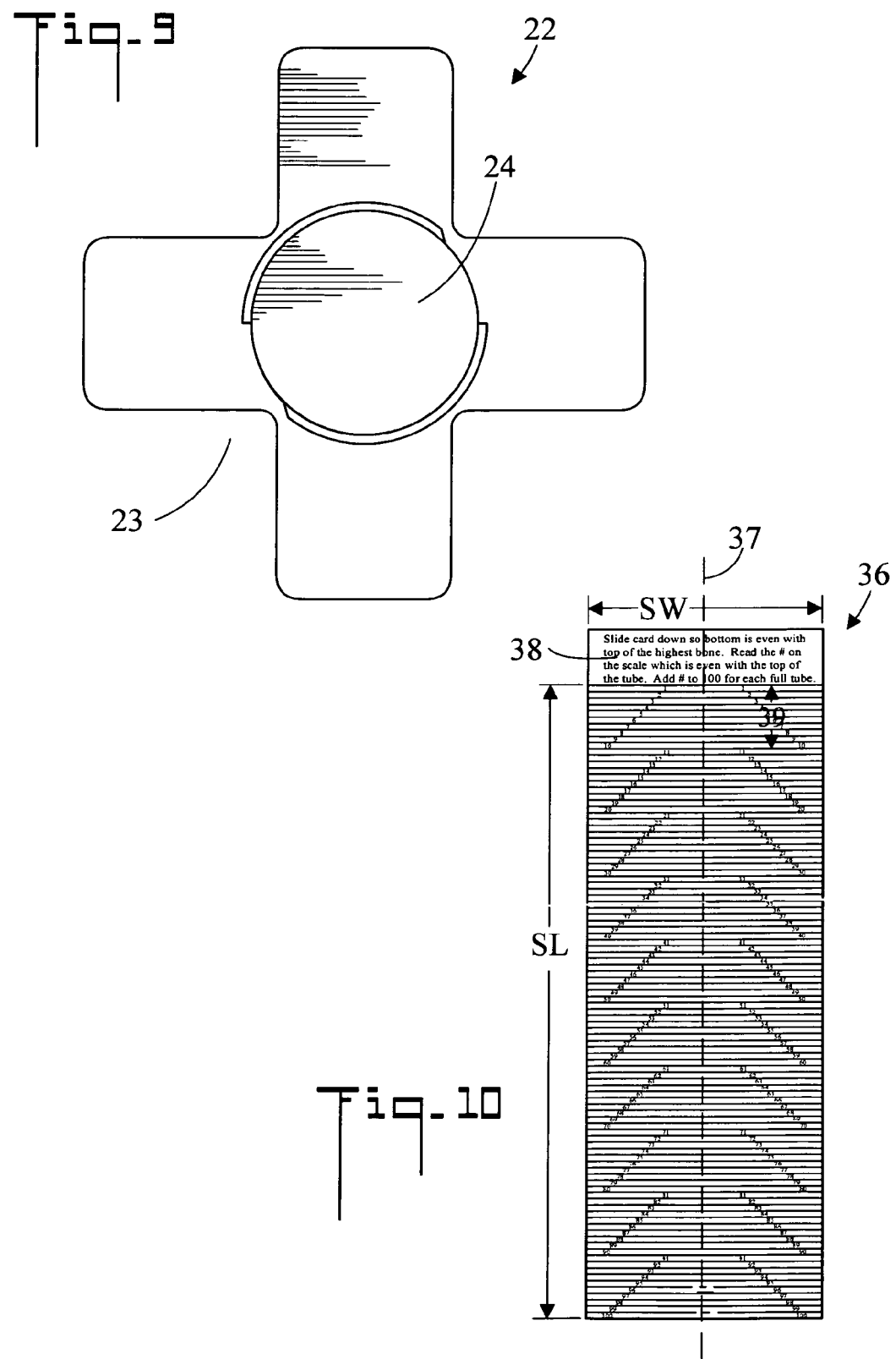

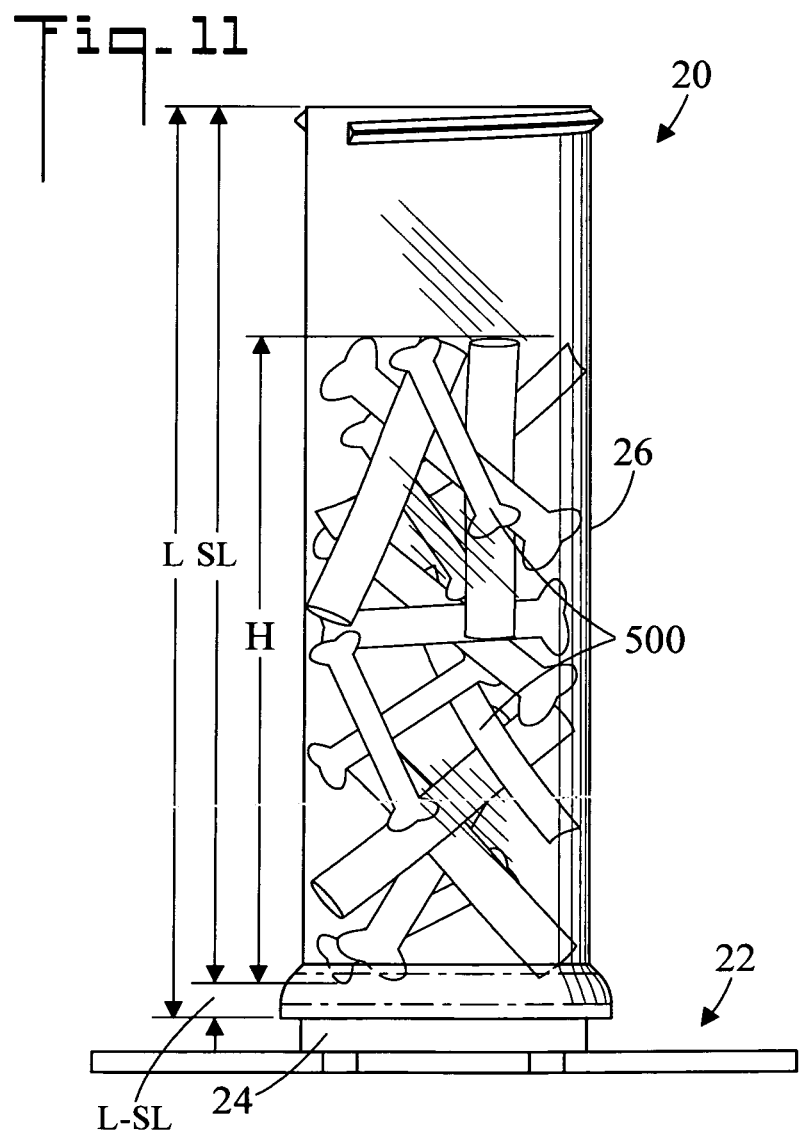

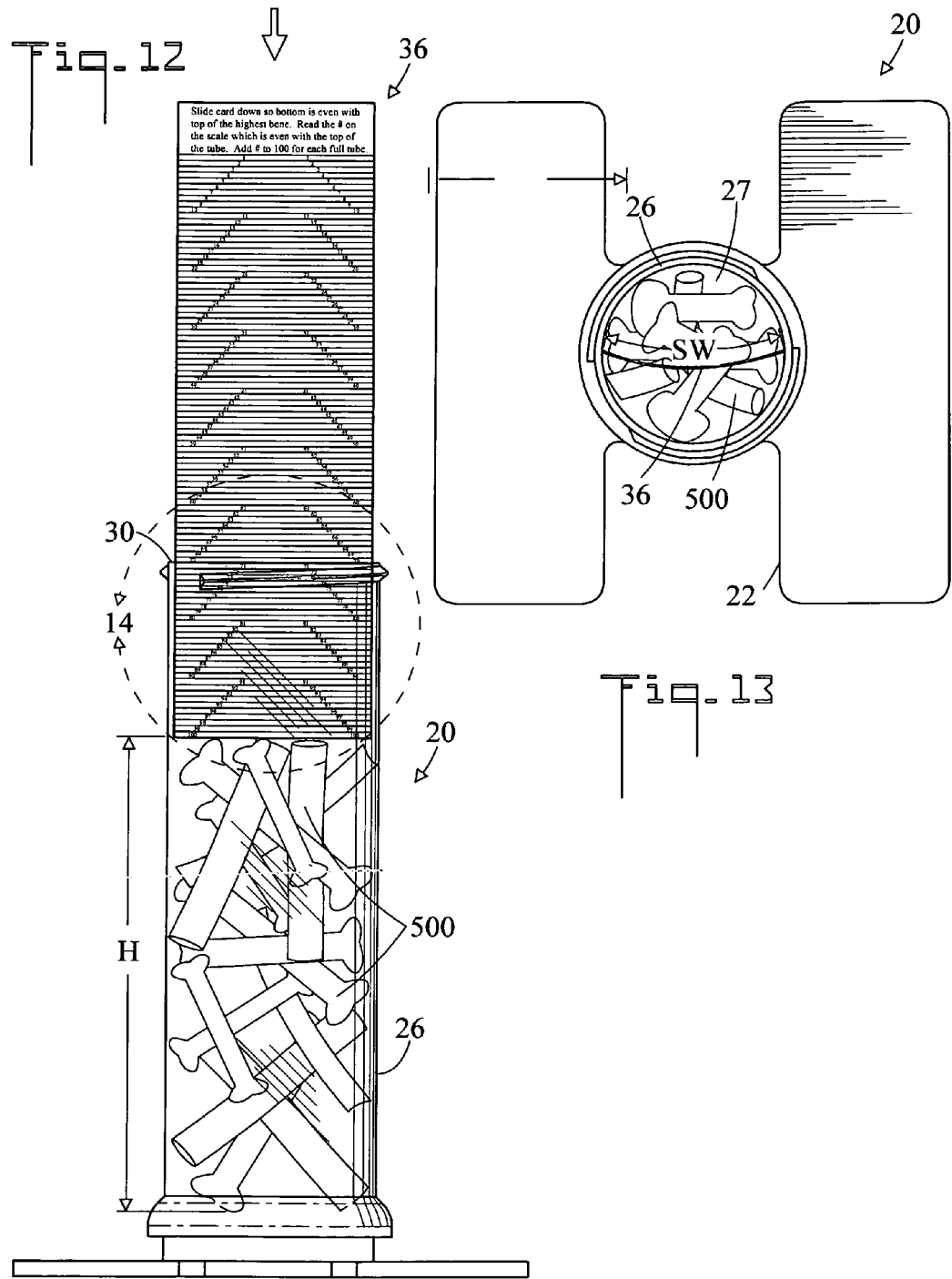

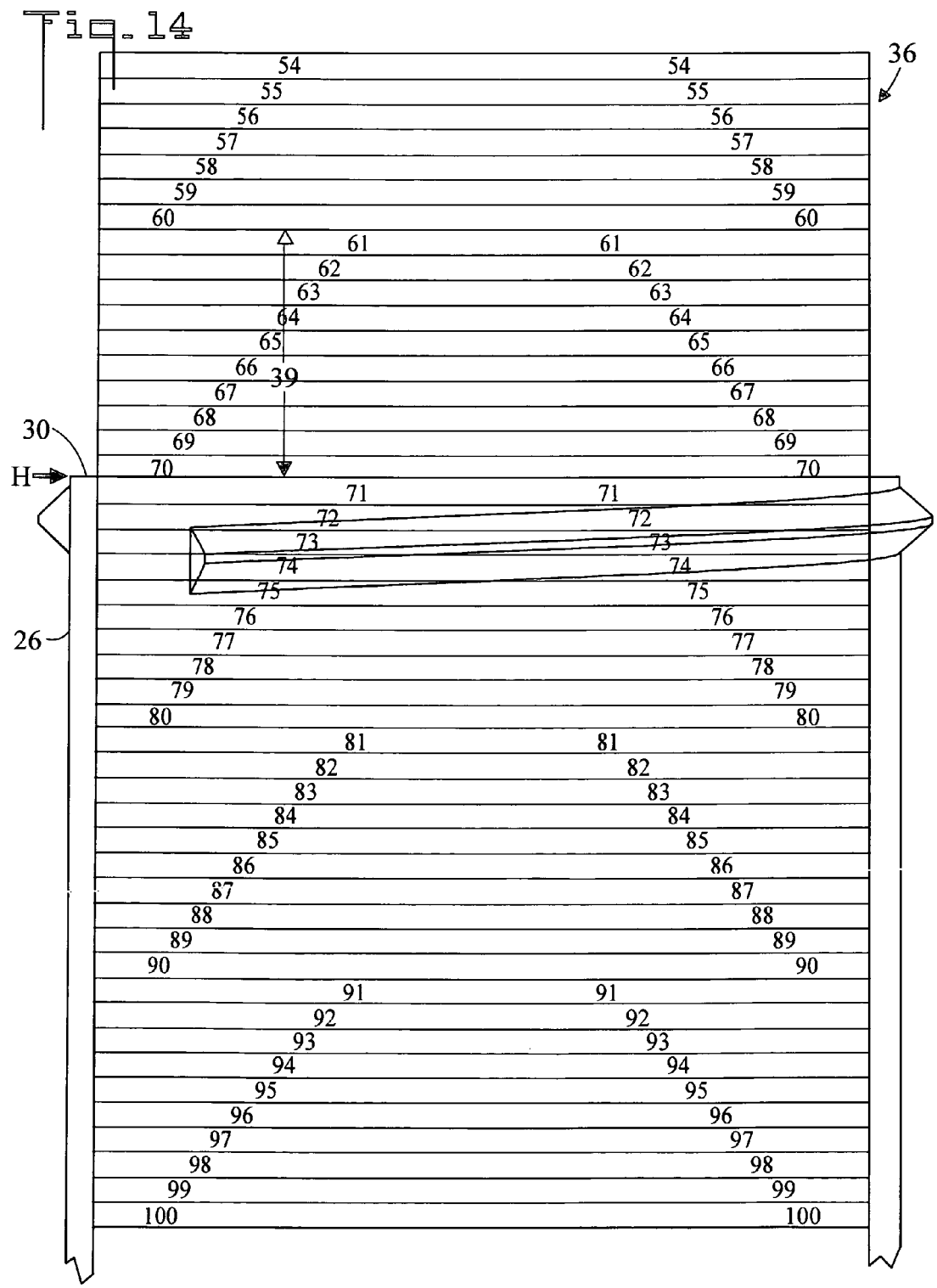

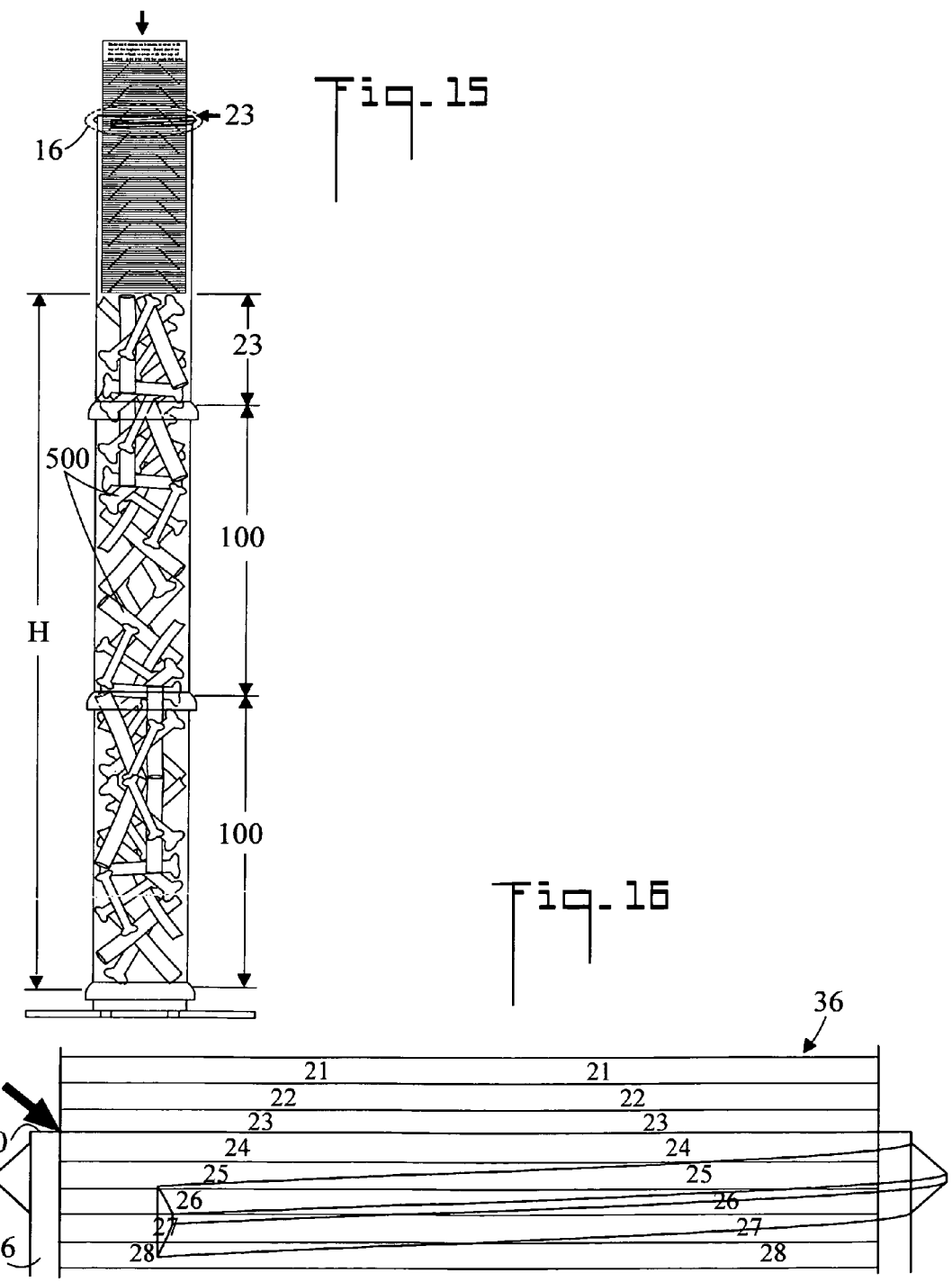

Slide card down so bottom is even with top of the highest bone. Read the # on the scale which is even with the top of the tube. Add # to 100 for each full tube.

OFFICIAL ENTRY FORM
(TEAM CAPTAIN COMPLETES BLUE ITEMS)

TODAY'S DATE:_____

PICK YOU TEAM CAPTAIN
NAME:_____

LIST YOUR TEAM NAME:

_____

LIST ALL TEAM MEMBER'S
EMAIL ADDRESSES:

1 _____

2 _____

3 _____

4 _____

5 _____

6 _____

—— SERVER TEARS HERE ——
CAPTAIN, EMAIL:

_____

(SERVER COMPLETES RED ITEMS)
HEIGHT_____ # ON TEAM_____

TOTAL TAB:

$ _____

RECEIPT #_____

SERVER: _____

ENTERED BY:_____

Fig. 19

Slide card down so bottom is even with top of the highest bone. Read the # on the scale which is even with the top of the tube. Add # to 100 for each full tube.

FROM STEP (f), SHEET 16/19

(g) AS THE FOOD RESIDUE IS PRODUCED IN (f), DEPOSITING THE FOOD RESIDUE INTO THE FOOD RESIDUE-RECEIVING CONTAINER;

(h) STOPPING THE EATING OF (f) AND THE DEPOSITING OF (g);

(i) USING THE SCALE TO MEASURE A HEIGHT OF THE FOOD RESIDUE;

IN (c), THE SCALE SHAPED AND DIMENSIONED TO BE LONGITUDINALLY INSERTED INTO THE INTERNAL CAVITY;

IN (c), THE INTERNAL CAVITY HAVING A MAXIMUM TRANSVERSE DIMENSION, AND THE SCALE BEING FLEXIBLE AND HAVING A WIDTH WHICH IS GREATER THAN THE MAXIMUM TRANSVERSE DIMENSION OF THE INTERNAL CAVITY;

IN (i), INSERTING THE SCALE INTO THE INTERNAL CAVITY WHEREIN THE SCALE IS VERTICALLY ORIENTED IN THE INTERNAL CAVITY AND BOWS.

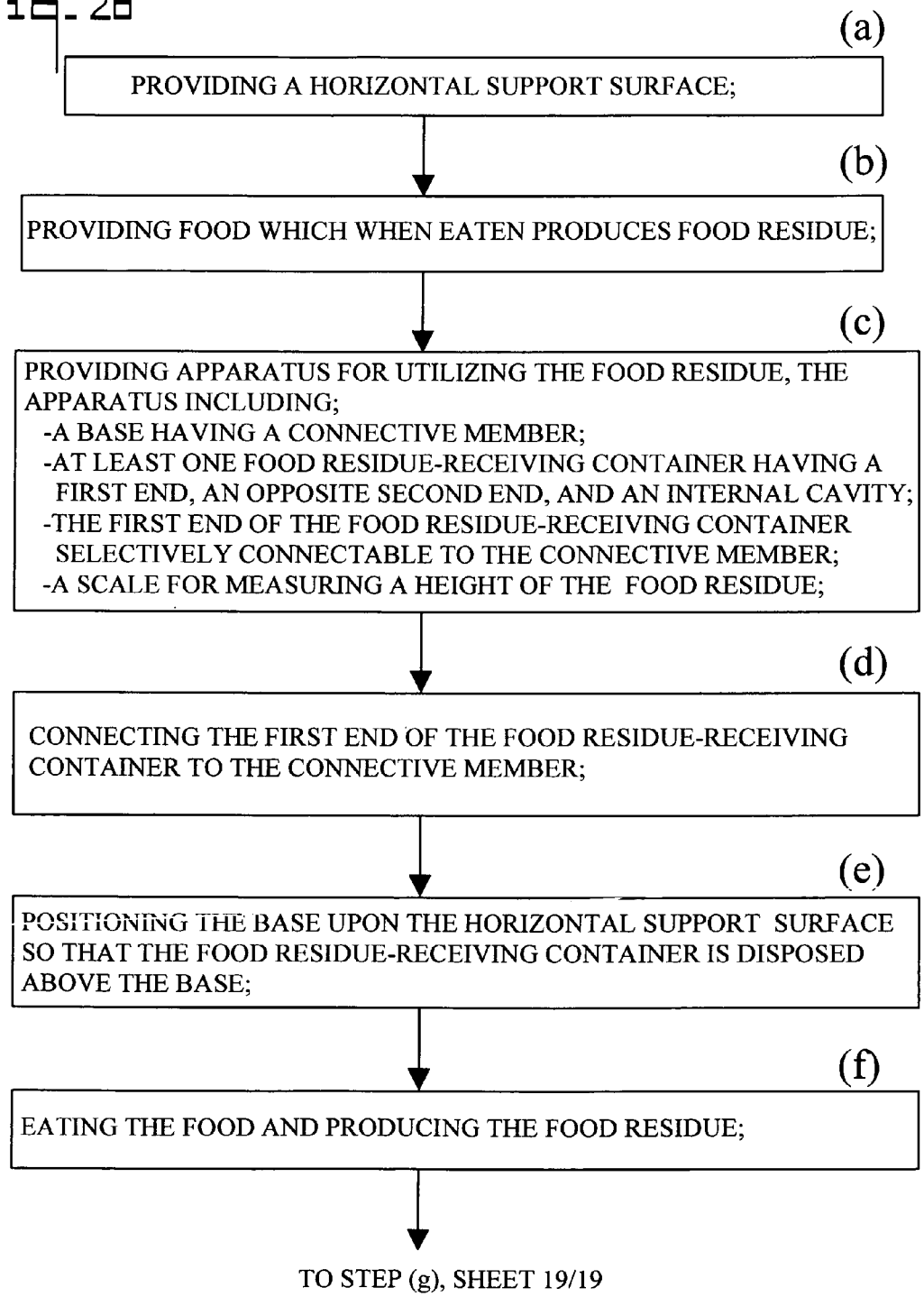

Fig. 26

FROM STEP (f), SHEET 18/19

CONTINUED (g) AS THE FOOD RESIDUE IS PRODUCED IN (f), DEPOSITING THE FOOD RESIDUE INTO THE FOOD RESIDUE-RECEIVING CONTAINER;

(h) STOPPING THE EATING OF (f) AND THE DEPOSITING OF (g);

(i) USING THE SCALE TO MEASURE A HEIGHT OF THE FOOD RESIDUE;

AFTER (i), DIVIDING THE HEIGHT OF THE FOOD RESIDUE BY A NUMBER OF PARTICIPATING INDIVIDUALS IN (f) AND (g) TO ARRIVE AT AN AVERAGE SCORE;

COMPARING THE AVERAGE SCORE WITH AN AVERAGE SCORE OF OTHER COMPETING PARTICIPANTS, AND AWARDING A PRIZE FOR THE HIGHEST AVERAGE SCORE.

APPARATUS AND METHOD FOR UTILIZING FOOD RESIDUE

CROSS REFERENCE TO RELATED APPLICATION

This application claims the filing benefit under 35 U.S.C. §119(e) of U.S. Provisional Application No. 61/461,866, filed Jan. 24, 2011, which is hereby incorporated by reference.

TECHNICAL FIELD

The present invention pertains generally to the consumption of food which produces food residue, and more particularly to an apparatus and method for temporarily utilizing the food residue.

BACKGROUND OF THE INVENTION

Many restaurants or other eating establishments sell food which inherently has an inedible component (food residue). Examples are the bones of chicken pieces, the bones of beef ribs, the bones of pork ribs, the bones or shells of seafood, and the like. After a meal the food residue is normally collected by the restaurant staff and appropriately disposed of.

BRIEF SUMMARY OF THE INVENTION

The present invention is directed to an apparatus and method which offer a temporary use for food residue, and can be utilized as a promotional tool for increasing business at a participating restaurant or other food serving establishment. The apparatus and method measure and compare the amount of food residue generated by participating individuals or groups of individuals. The apparatus and method can be applied to a broad variety of restaurants wherein customers (i.e. diners) generate food residue. As used herein the term "food residue" can embrace any residue which is left over from eating such as chicken bones (e.g. wings, drumsticks, etc.), beef bones (e.g. ribs, T-bones, etc.), pork bones (e.g. ribs, pork chop bones, etc.), sea food (e.g. lobster, crab, shrimp shells, etc.), other residue from animal parts, residue from vegetable foods such as nut shells, vegetable skins or cores, fruit skins or cores, or any other residue which is left over from eating. It is noted that in a portion of the descriptions which follow, the apparatus and method are used in a "Program" to promote restaurant sales. Program is a generic describer, and is intended to represent any commercial name (trade name, logo, etc.) which could apply the apparatus and method disclosed herein. The Program is briefly described below:

1. Both the restaurant and the customers register as participants of the Program which is owned and administrated by a managing entity (Program Headquarters). The Program can extend to hundreds of restaurants and to thousands of customers. Customers are registered in a specifically designed software data base as participating members who will consume the edible portions of the food. (each customer registers on the Program's website as a "member" and receives discounts and other inducements).

2. The customers visit a participating restaurant and order food which has a food residue.

3. The restaurant prepares the food and serves it to the customers.

4. The customers then consume all edible portions of the food. (e.g. a group of friends goes to chicken wing place and eats wings and drink beer.)

5. The customers drop the food residue (e.g. left over bones) into a specifically designed vertically extending container.

6. A restaurant representative (server or manager) then measures the height of the food residue with a specially designed measuring scale.

7. The height measurement along with restaurant and customer information is entered into a database (such as on a website) which is maintained by the Program Headquarters.

8. The restaurant representative takes a digital photo of (1) the food residue in the container, and (2) of the customers.

9. The digital photos are entered into a Program database which can be viewed by others.

10. Database entries from numerous restaurants and customers are then periodically compared to determine winners (those with the highest score), and prizes are awarded. The comparison and prizes can be awarded on a daily, weekly, monthly, quarterly, and annual basis.

In accordance with an embodiment, apparatus for utilizing food residue includes a base which has a connective member. The apparatus also includes at least one open ended food residue-receiving container which has a first end and an opposite second end. The first end of the food residue-receiving container is selectively connectable to the connective member, so that the food residue-receiving container is perpendicular to the base.

In accordance with another embodiment, a second food residue-receiving container is provided which is structurally identical to the food residue-receiving container. The second end of the food residue-receiving container is selectively connectable to the first end of the second food residue-receiving container, so that the second food residue-receiving container and food residue-receiving container can be placed in stacked vertical relationship.

In accordance with another embodiment, the food residue-receiving container is a circular tube. The first end of the food residue-receiving container includes one of a female threaded connector and a male threaded connector. The second end of the food residue-receiving container and the connective member each include the other of the female threaded connector and the male threaded connector.

In accordance with another embodiment, the food residue-receiving container has an internal cavity which has a length and a maximum transverse dimension. A scale is provided which is shaped and dimensioned to be longitudinally inserted into the internal cavity.

In accordance with another embodiment, the scale has a scale length which is less than the length of the internal cavity.

In accordance with another embodiment, the scale is flexible and has a width which is greater than the maximum transverse dimension of the internal cavity, so that when the scale is inserted into the internal cavity the scale centers itself in a vertical orientation in the internal cavity and bows.

In accordance with another embodiment, the scale has a longitudinal axis, and a scale length which is partitioned into 100 divisions. The 100 divisions being divided into ten groups of ten numbers, wherein each group of ten numbers is disposed in a line which is at an angle with respect to the longitudinal axis.

In accordance with another embodiment, a scale is disposed on the food residue-receiving container for the purpose of measuring a height of the food residue.

In accordance with another embodiment, a scale is shaped and dimensioned to be placed adjacent to the food residue-receiving container for the purpose of measuring a height of the food residue.

In accordance with another embodiment, the food residue-receiving container has one of a rectangular and oval shape.

Other embodiments, in addition to the embodiments enumerated above, will become apparent from the following detailed description, taken in conjunction with the accompanying drawings, which illustrate, by way of example, the principles of the apparatus and method.

BRIEF DESCRIPTION OF THE DRAWINGS

FIG. 1 is a perspective view of an apparatus for utilizing food residue;

FIG. 2 is a top plan view of the apparatus;

FIG. 3 is a side elevation view of the apparatus;

FIG. 4 is an exploded perspective view of the apparatus;

FIG. 5 is a side elevation view of a food residue-receiving container;

FIG. 6 is a top plan view of a base;

FIG. 7 is a side elevation view of the base;

FIG. 8 is another side elevation view of the base;

FIG. 9 is a top plan view of a second embodiment of the base;

FIG. 10 is a side elevation view of a scale;

FIG. 11 is side elevation view of the apparatus with food residue contained therein;

FIG. 12 is a side elevation view of the apparatus and food residue and the scale for measuring the height of the food residue;

FIG. 13 is a top plan view of the apparatus, food residue, and scale;

FIG. 14 is an enlarged view of area 14 of FIG. 12;

FIG. 15 is a reduced side elevation view of the apparatus including three stacked food residue-receiving containers;

FIG. 16 is an enlarged view of area 16 of FIG. 15;

FIG. 17 is an enlarged view of the scale;

FIG. 18 is an enlarged view of the reverse side of the scale;

FIG. 19 is an enlarged view of a portion of FIG. 17;

FIG. 20 is an enlarged view of another portion of FIG. 17;

FIG. 26 is a flow chart showing another method for using food residue.

DETAILED DESCRIPTION OF THE INVENTION

Figure 21:
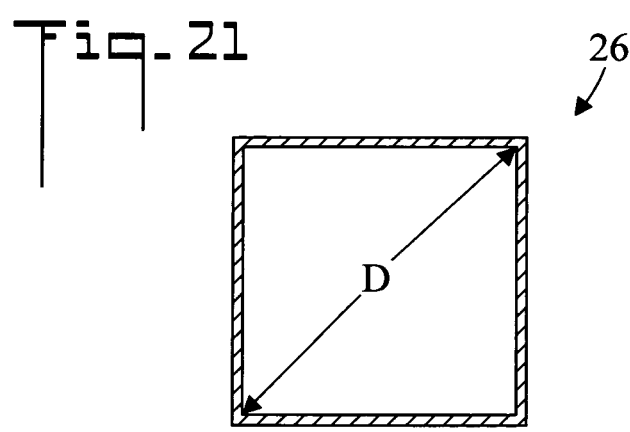
FIG. 21 is a cross sectional view of another food residue-receiving container.

Referring initially to FIGS. 1-4, there are illustrated perspective, top plan, side elevation and exploded perspective views respectively of an apparatus for utilizing food residue, the apparatus generally designated as 20. Apparatus 20 includes a base 22 which has a connective member 24 (also refer to FIGS. 6-8), and which is positionable upon a horizontal support surface 400. In the shown embodiment, base 22 is "H" shaped having two notches 23, which can receive objects such as salt and pepper shakers and the like. In an embodiment, base 22 is about 10 inches by 10 inches. In the shown embodiment, connective member 24 includes an upstanding platform. Apparatus 20 also includes a food residue-receiving container 26 having a first end 28 and an opposite second end 30 (also refer to FIG. 5). First end 28 of food residue-receiving container 26 is selectively connectable to connective member 24, so that food residue-receiving container 26 is perpendicular to base 22. In the shown embodiment, food residue-receiving container 26 includes a circular tube which is open at both ends, and which has an internal cavity 27 having a length L and a maximum transverse dimension D, which is the inside diameter of container 26 in the shown embodiment (refer to FIG. 5). In an embodiment the length L is about 10.5 inches and the maximum transverse dimension D (inside diameter) is about 3 inches. It is noted that, maximum transverse dimension D is measured perpendicular to the longitudinal axis 39 of container 26. First end 28 of food residue-receiving container 26 includes one of a female threaded connector 32 (also refer to FIG. 5) and a male threaded connector 34, and second end of 30 of food residue-receiving container 26 and connective member 24 each include the other of female threaded connector 32 and male threaded connector 34. In the shown embodiment first end 28 of food residue-receiving container 26 has female threaded connector 32, and second end 30 and connective member 24 have male threaded connector 34. FIG. 4 illustrates the manner in which food residue-receiving container 26 is threaded onto connective member 24. In an embodiment, food residue-receiving container 26 is fabricated from a transparent material such as a clear polymer or other clear material so that the food residue 500 which is deposited in the container can be seen. Further, base 22 and food residue-receiving container 26 are fabricated from dishwasher safe materials to allow easy and safe cleanup.

FIG. 5 is a side elevation view of food residue-receiving container 26 showing first end 28, second end 30, female threaded connector 32, male threaded connector 34, and length L.

FIG. 6 is a top plan view of base 22 showing connective member 24, male threaded connector 34, and notches 23.

FIG. 7 is a side elevation view of base 22 showing connective member 24, male threaded connector 34 and notches 23.

FIG. 8 is another rotated side elevation view of base 22 showing connective member 24 and male threaded connector 34.

FIG. 9 is a top plan view of a second embodiment of base 22. In this embodiment, base 22 is cross shaped.

FIG. 10 is a side elevation view of a scale 36. FIGS. 14, 17, 18, and 19 show enlarged views of scale 36 which is utilized to measure the height H of the food residue 500 (refer to FIGS. 11 and 12). Scale 36 has a longitudinal axis 37, and is shaped and dimensioned to be longitudinally inserted into internal cavity 27 of food residue-receiving container 26, as is shown in FIG. 12. Scale 36 has a scale length SL which is less than length L of internal cavity 27, and a scale width SW. Scale length SL is utilized to measure the height H of food residue 500 which has been deposited within food residue-receiving container 26. Scale 36 also has an upper portion 38 which can be gripped by a user. In the shown embodiment, scale 36 is planer, and is fabricated from a flexible sheet of coated paper or cardboard, or from a polymer. Scale length SL is partitioned into 100 divisions (representing 100 points). The 100 divisions are further divided into ten groups 39 of ten numbers (i.e. 1-10, 11-20, 21-30, etc.). Each group 39 of ten numbers is disposed in a line which is at an angle with respect to longitudinal axis 37.

FIG. 11 is side elevation view of apparatus 20 with food residue 500 (such as bones) contained therein. Food residue-receiving container 26 has been connected to connective member 24 of base 22. One or more participating individuals eat food which produce food residue 500. The food residue 500 is then deposited into food residue-receiving container 26. As more food is eaten and the food residue 500 is deposited, the height H of the food residue 500 within food residue-receiving container 26 increases.

FIG. 11 also depicts the relationship of the length L of internal cavity 27 and scale length SL of scale 36. Scale length SL is equal to the useable length of food residue-receiving container 26, which is less than the length L of internal cavity 27. The difference L-SL is required because of either the connection of food residue-receiving container 26 to connective member 24, or the connection of food residue-receiving container 26 to another food residue-receiving container 26. That is, some of the length L is lost in order to effect the connection. As such, food residue-receiving container 26 can only accommodate a maximum height H of food residue 500, which is Hmax=L-(L-SL)=SL.

FIGS. 12 and 13 are side elevation and top plan views respectively of apparatus 20, food residue 500, and scale 36 for measuring the height H of the food residue 500. Scale 36 is downwardly inserted into internal cavity 27 of food residue-receiving container 26 until it contacts the top of food residue 500. Scale 36 is flexible and has a width SW which is greater than maximum transverse dimension D of internal cavity 27 (refer to FIG. 1). As such, when scale 36 is inserted into internal cavity 27, scale 36 centers itself in a vertical orientation in internal cavity 27 and bows (curves). The bowing of scale 36 is best seen in FIG. 13. Height H of food residue 500 is then read off of scale length SL of scale 36 with second end 30 of food residue-receiving container 26 serving as the index point. Also referring to FIG. 14, in the shown embodiment the height H reading is 70 points.

FIG. 14 is an enlarged view of area 14 of FIG. 12, showing food residue-receiving container 26, second end 30 (index), scale 36, and groups 39 of ten numbers. In the shown embodiment, the food reside 500 height is 70 points.

FIG. 15 is a reduced side elevation view of apparatus 20 including three stacked food residue-receiving containers 26 with food residue 500 and scale 36. In this instance, the amount of created food residue 500 is more than one food residue-receiving container 26, or even two containers 26 can hold. As such, as the food is eaten and the food residue 500 deposited, second and third food rescue-receiving containers 26 had to be connected to the base (bottom container 26). The total height H (in points) of the food residue 500 as shown is then 100+100+23=223 (refer also to FIG. 16). It may be generally appreciated that as the number of individuals eating food and depositing food residue 500 increases, the number of required food residue-receiving containers 26 will also increase.

A second (or third in the shown example) food residue-receiving container 26 is provided which is structurally identical (shape and size) to the bottom (base) food residue-receiving container 26. Also referring to FIG. 5, the second end 30 end of food residue-receiving container 26 (base container) is selectively connectable to the first end 28 of the second food residue-receiving container 26, so that the second food residue-receiving container 26 and the base food residue-receiving container 26 can be placed in stacked vertical relationship. That is, the design is modular so that two, three, or more containers 26 may be stacked in vertical relationship.

FIG. 16 is an enlarged view of area 16 of FIG. 15 showing scale 36. Height H of food residue 500 is then read off of scale length SL of scale 36 with second end 30 of food residue-receiving container 26 serving as the index point. In the shown embodiment the height H reading is 23 points, which is added to the 200 points of the bottom two food residue-receiving containers 26 of FIG. 15. to give a total height of 223 points.

Figure 20:
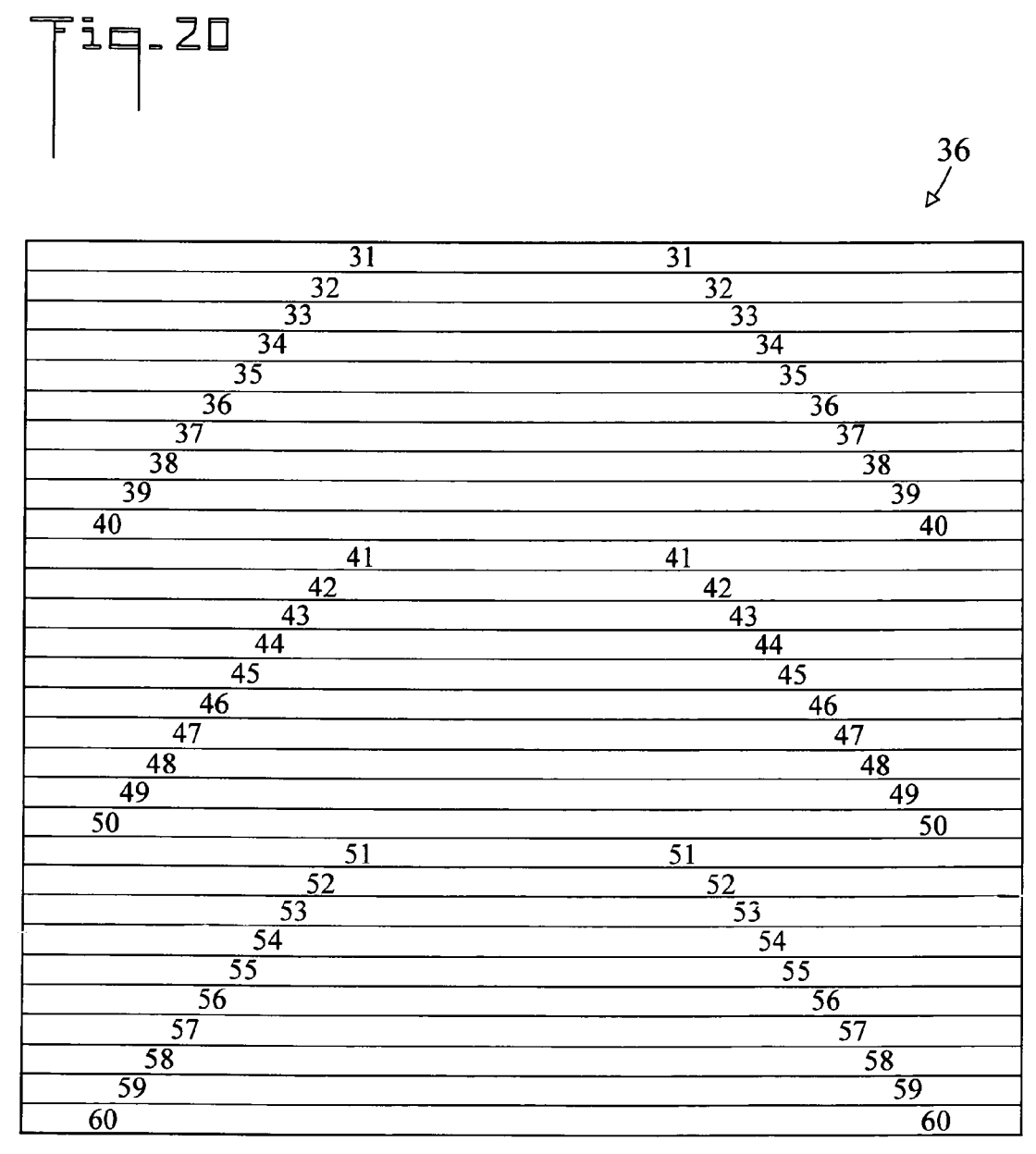

FIG. 17 is an enlarged view of scale 36. Enlarged views of scale 36 are shown in FIGS. 14, 16, 19, and 20.

FIG. 18 is an enlarged view of the reverse side of the scale 36, which serves as an official entry for teams which are using apparatus 20 in and effort to establish a highest point total (i.e. height of food residue 500).

FIGS. 19 and 20 are enlarged views of portions of FIG. 17.

FIG. 21 is a cross sectional view of another food residue-receiving container 26. In this embodiment food residue-receiving container 26 has a rectangular shape (rather than the circular shape of FIG. 1); and has a maximum transverse dimension D which is a diagonal of the rectangle.

Figure 22:
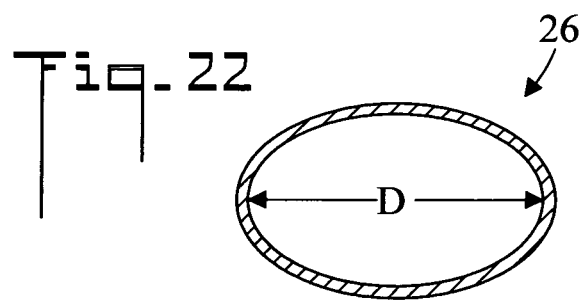
FIG. 22 is a cross sectional view of another food residue receiving container.

FIG. 22 is a cross sectional view of another food residue-receiving container 26. In this embodiment food residue-receiving container 26 has an oval shape, and has a maximum transverse dimension D which is the major axis of the oval. It is noted that in the embodiments of FIGS. 21 and 22, a slip joint could be used to connect the food residue-receiving container 26 to base 22 or to other food residue-receiving containers 26.

Figure 23:
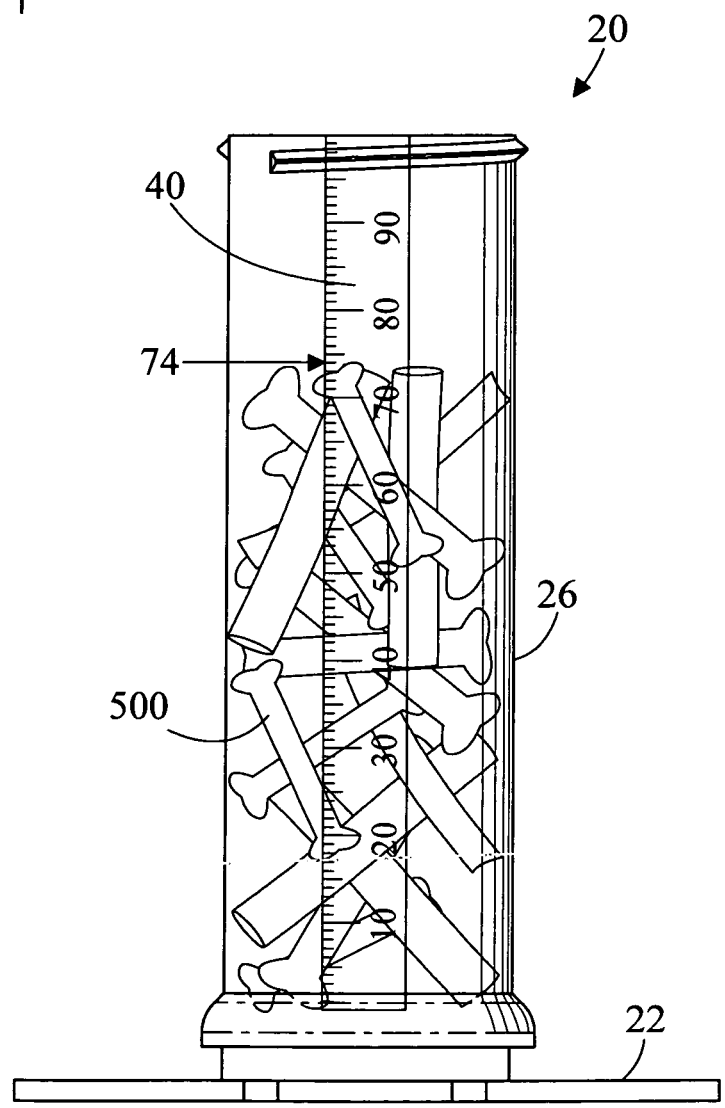
FIG. 23 is a side elevation view of a scale disposed on the food residue-receiving container.

FIG. 23 is a side elevation view of a scale 40 which is disposed on food residue-receiving container 26 (such as by marking, etching, painting, a decal, or the like), for the purpose of measuring the height H of food residue 500. In this embodiment, scale 40 is a permanent part of food residue-receiving container 26, rather than being a separate unit as in scale 36. It is also noted that scale 40 resembles a ruler which has 100 divisions (points). The height H of food residue 500 is read off of scale 40. In the shown embodiment the height H is 74.

Figure 24:
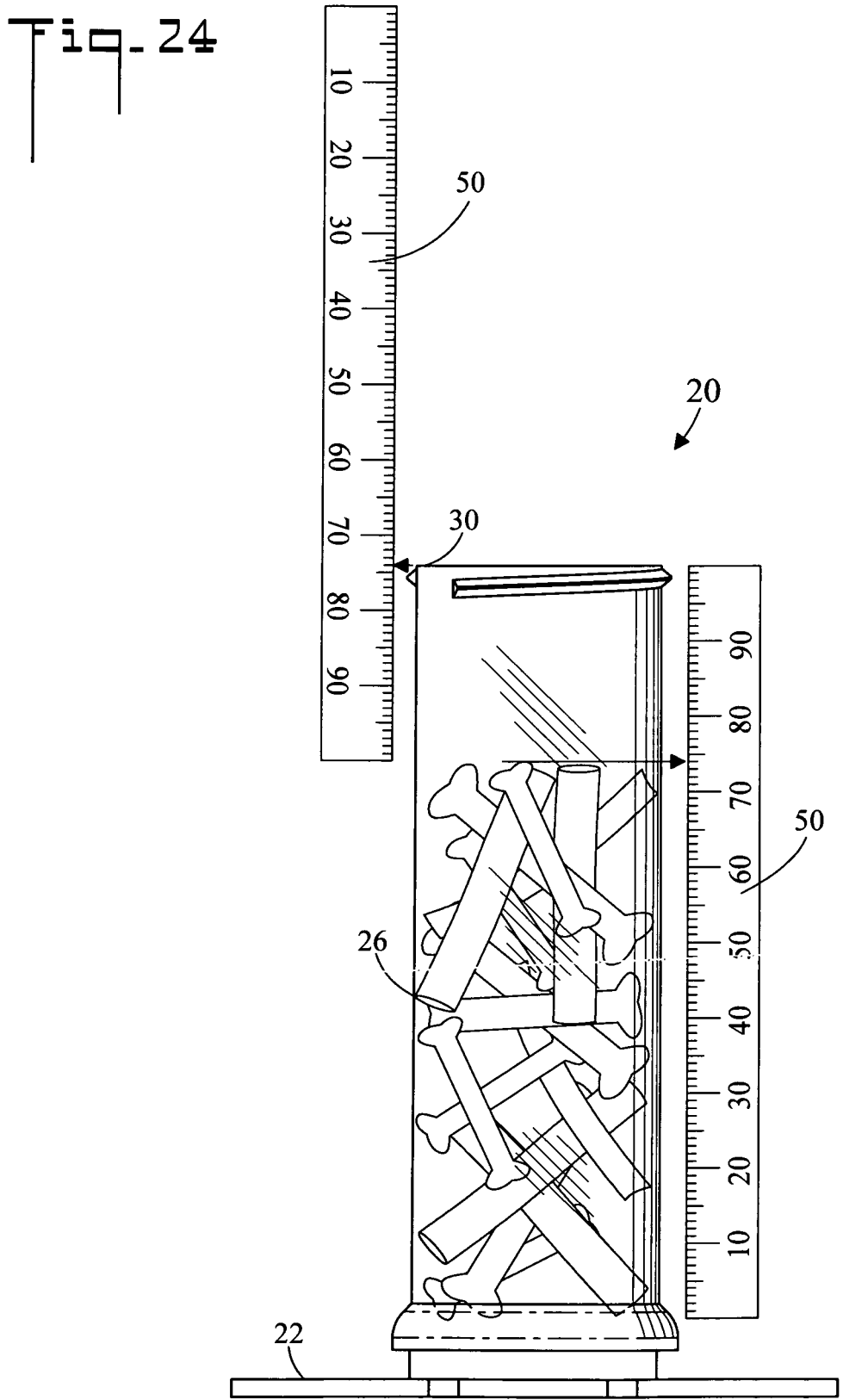
FIG. 24 is a side elevation view of other height measuring methods.

FIG. 24 is a side elevation view of other height measuring methods. In this embodiment a separate scale 50 is shaped and dimensioned to be placed adjacent to (outside) food residue-receiving container 26 for the purpose of measuring the height H of food residue 500. Scale 50 can be placed alongside food residue-receiving container 26 with the index point (zero height) being at the bottom of container 26. Or, scale 50 can be inverted and placed adjacent the top of container 26 with second end 30 serving as the index point.

Figure 25:
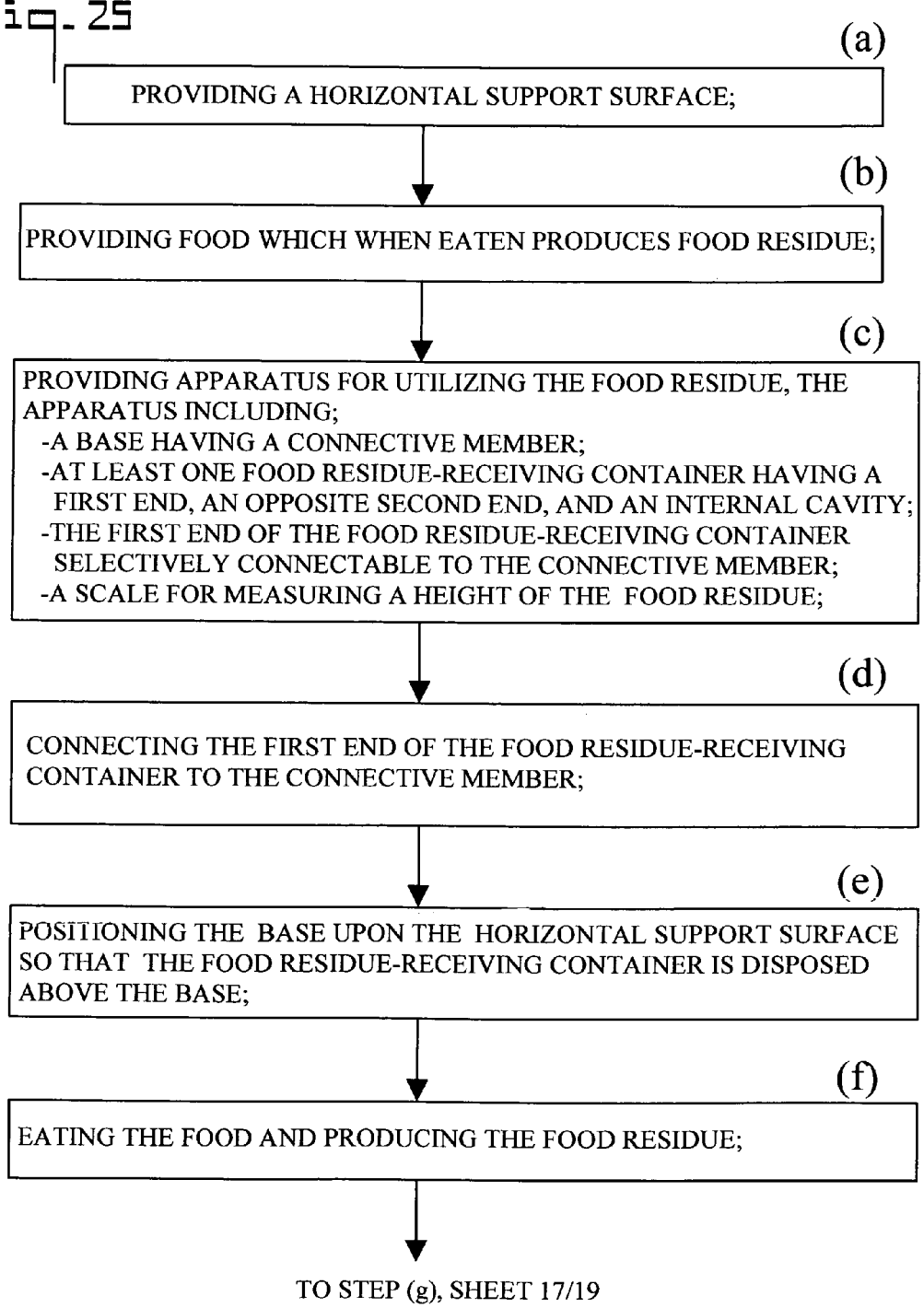
FIG. 25 is a flow chart showing a method for using food residue.

FIG. 25 is a flow chart showing a method for using food residue, and FIG. 26 is a flow chart showing another method for using food residue.

In terms of use, a method for utilizing food residue is described below. It is noted that the method can be practiced by a group if participating individuals (such as a team) or by a single individual. (Refer also to FIGS. 1-24)

(a) providing food which when eaten produces food residue 500;

(b) providing apparatus 20 for utilizing the food residue 500, apparatus 20 including:
  a base 22 having an connective member 24;
  at least one food residue-receiving container 26 having a first end 28, an opposite second end 30, and a internal cavity 27;
  first end 28 of food residue-receiving container 26 selectively connectable to connective member 24;
  a scale for measuring a height of said food residue;

(c) connecting first end 28 of food residue-receiving container 26 to connective member 24 so that food residue-receiving container 26 is perpendicular to base 22;

(d) eating the food and producing food residue 500;

(e) as food residue 500 is produced in (d), depositing the food residue 500 into food residue-receiving container 26;

(f) stopping the eating of (d) and the depositing of (e); and, (g) using scale 36 to measure a height H of food residue 500. It is noted that (g) is typically performed by an official entity such as a member of a restaurant staff (rather than by the group or individual who are performing the eating and depositing of (d) and (e)). Further, in an embodiment, the height H is measured in "points" rather than in a standard measure such as inches, centimeters, etc.

The method further including:

in (b), providing a second food residue-receiving container 26 which is structurally identical to the food residue-receiving container 26; second end 30 of food residue-receiving container 26 being selectively connectable to first end 28 of second food residue-receiving container 26; and, during the depositing in (e), (1) food residue-receiving container 26 becoming full with food residue 500, (2) connecting second food residue-receiving container 26 to food residue-receiving container 26 so that second food residue-receiving container 26 and food residue-receiving container 26 reside in stacked vertical relationship, and (3) continuing the depositing in (e).

The method of claim 10, further including:

in (b), food residue-receiving container 26 including a circular tube;

in (b), first end 28 of food residue-receiving container 26 including one of a female threaded connector 32 and a male threaded connector 34, and second end 30 of food residue-receiving container 26 and connective member 24 each including the other of female threaded connector 32 and male threaded connector 34; and, in (c), using female 32 and male 34 threaded connectors to effect the connection of food residue-receiving container 26 to connective member 24.

The method further including:

in (b), scale 36 is shaped and dimensioned to be longitudinally inserted into internal cavity 27, scale 36 has a scale length SL;

in (b), internal cavity 27 of food residue-receiving container 26 having a length L; and, in (b) scale length SL being less than length L of said internal cavity.

The method further including:

in (b), scale 36 is shaped and dimensioned to be longitudinally inserted into internal cavity 27;

in (b), internal cavity 27 having a maximum transverse dimension D, and scale 36 being flexible and having a width SW which is greater than maximum transverse dimension D of internal cavity 27, and, in (g), inserting scale 36 into internal cavity 27 wherein scale 36 centers itself in a vertical orientation in internal cavity 27 and bows.

The method further including:

in (b), scale 36 having a longitudinal axis 37 and being partitioned into 100 divisions, the 100 divisions being divided into ten groups of ten numbers, wherein each group of ten numbers is disposed in a line which is at an angle with respect to longitudinal axis 37.

The method further including:

in (b), scale 40 is disposed on food residue-receiving container 26.

The method further including:

in (b), scale 50 is shaped and dimensioned to be placed adjacent to food residue-receiving container 26.

The method further including:

in (b), food residue-receiving container 26 having one of a rectangular and oval shape.

The method further including:

after (g), dividing height H of food residue 500 by a number of participating individuals in (d) and (e) to arrive at an average score.

The method further including:

comparing the average score with an average score of other competing participants, and awarding a prize for the highest average score.

The present invention comprises apparatus and a method for using food residue to promote sales for restaurants or other eating establishments. The apparatus and method are used in a Program. A description of one possible Program embodiment follows.

The Program:

The Program is a way of helping promote restaurant sales for affiliated restaurants. The main function of the Program is to allow one or many restaurant customers to gather at an affiliated restaurant for fun, camaraderie and a meal of food containing food residue (e.g. bones). The customers attempt to maximize the height of the food residue from the food which they consume. The food residue is dropped into a specifically designed container 26, and is then measured by a measuring scale 36. By doing so, their goal is to accumulate the highest official score for the day, week, month, quarter, year etc. The Program is owned and operated by a Program management entity (Program Headquarters).

The Participating Restaurants:

Certain restaurants whose owners choose to become a Program affiliate because they believe that the Program will help promote their business (affiliated restaurants are called "Hangouts" or "Program Hangouts".). These restaurants offer (or would like to offer) items having food residue as one of their main food offerings. Applying restaurants are approved by the Program Headquarters. The participating restaurants then prominently display Program identification such as banners, signs and the Program logo. The restaurants offer periodic coupons for discounts, free food, et cetera to customers who have signed up for the Program. The restaurants agree to pay monthly fee to Program Headquarters.

Customer Registration on the Program Website:

Restaurant customers register their name, email and birth date and other information on the Program website which is maintained by Program Headquarters. In so doing the customers become members of the Program. This website includes custom designed software and a database which performs many functions such as:

Accepts member registration and prints coupons.

Holds data for restaurant affiliates and others to use for promotions via direct email to the members.

Accepts and displays digital photos of members and others, eating food and placing food residue into the container (called "stacking").

Tracks the account, including all transactions, of affiliates doing business with the Program.

Allows for "banner style" digital advertising space for third party advertisers (such as beverage and sauce sellers).

Other related functions.

Periodic Contests:

In one embodiment, a weekly contest begins each week on a specific day at a specific time, and ends exactly one week later. All entries for the week are reviewed to determine a winner. Example: During the week there are 975 official entries input into the Program website from 48 different participating restaurants. The one entry with the highest official Program Score wins that weeks contest. Each entry is measured using a specifically designed measuring scale 36, photographed and entered into the Program website by a designated restaurant representative. Software generates the "Official Score". At the end of the week, the officials of the Program management entity review the entries and determine the winner(s) and award prizes. The next week's contest starts at the precise time when previous week's contest ends. Customers long term results are accumulated in the website database for use by Program Headquarters to determine longer term winners, such as monthly, quarterly and/or annually.

Program Finances:

Restaurants contractually agree to pay the Program Headquarters a monthly fee to be included as a Program affiliate. Program Headquarters collects these monthly fees from all the affiliates and uses a portion of these funds for prizes, coupons and other inducements to the customers to encourage them to visit affiliated restaurants and participate in the Program.

Official Score:

To make the process fair for a single member versus a team of several members, or for teams with an unequal number of members, a mathematical formula "levels the playing field" for all size teams (from one to any number) who wish to compete against each other. The formula simply divides the total measured height (points) of food residue by the number of team members to arrive at an "official score" (the average height consumed by each team member). For example, one team is Mom, Dad, 12 year old Johnny and 10 year old Sissy (4 members). They stack up bones to a height of 103 on the measuring scale 36. The team at the next table is an 11 member baseball team from the college who stacks up bones to the height of 267 on the measuring scale. The 11 person team sees the four person family and is confident of winning. No contest, right? Wrong! The Family WON. The mathematical formula "leveled the field" and resulted in the following official scores:

Family—103 (height) divided by 4 (# of members)=25.75 is official score

Team—267 (height) divided by 11(# of members)=24.27 is official score

The Program Website:

The Program website has a standard "Home" page with an introduction which describes the Program process. A "Frequently Asked Questions" section will educate potential restaurant owners and customers about the Program and how it operates.

The website will contain a "Register Free" application section and associated database where customers register to participate in the Program. When a customer registers, the website can automatically print several gift certificates, and other coupons for discounts on food at affiliate Program restaurants. This same section of the website also allows customers to form teams and to name their teams. Individual customers or teams can compete in the process.

Another section of the website is "Past Winners". This section shows photos and score results for previous winners (e.g. weekly, monthly, quarterly, or annually). Purposely, it does not show scores for current time period entries until after the current contest is closed; thus not allowing teams or members to decide whether to compete in the current contest by looking at existing current entries' scores. For example, weekly winners would not be shown until after the week's contest is closed. This is important because with today's mobile access to the internet, it could cause a team to decide not to compete the current contest because of another entry that has a seemingly unbeatable, high score.

Another section of the website is entitled "Find My HangOut". This section is designed so that someone can enter their zip code and select a number of miles away from their zip code (i.e.; within 5, 10, 15, 20, or 25 miles) that they would like to search for a Program affiliate restaurant or "HangOut". In another embodiment, should no existing affiliate HangOut be near enough to the inquirer to match his/her chosen criteria, the inquirer will be asked to enter the name of his/her favorite food residue-producing restaurant and its city and state. This information will provide Program Headquarters with a list of potential affiliates and will provide additional inducement for convincing owners of potential affiliates to sign on to become affiliated with the Program.

Another section of the website, is entitled "HangOut Crew Members". This section is designed for use by participating restaurant owners (and/or their designated employees) only and not for participating restaurant customers. This section is secure using double passwords and as technology allows other more secure and sophisticated security methods. The main function of this section of the website is to accept and display uploads of the official entries and photographs, using mathematical formula to calculate the "Official Score". The Official Entry Form is then given to the customers as a physical receipt of the result thus confirming their entry and this section also allows HangOut owners (or designated employees) to:

View their account, including all transactions with the Program

Order supplies from the Program Headquarters and others willing to offer discounts See their list of entries and/or winners Watch training videos (which are custom designed for this site)

Send these training videos to other email addresses for use later

Send email coupons and other promotional information to their Program customers registered and retained in the data base Another section of the website is entitled "Contact us", and provides the contact information for Program Headquarters as well as an application restaurants may use to become a Program HangOut.

Another section of the website provides quick links to the websites of all affiliated Program restaurants.

Another section of the website allows each restaurant HangOut page to display advertisements and links to social networks such as Facebook, Twitter, et cetera.

Program Prizes:

This listing shown below is not intended to be a complete listing as other additional prizes can be added later. It will show what is anticipated as offerings at this time and the frequency and the methodology by which prizes are awarded.

A large annual Grand Prize will be offered in a contest in which skill and luck both play a part. All weekly winners will be eligible to win this prize.

Weekly winners will get a gift certificate valued equal to the amount they spent in the session that produced their winning score.

Each member (winner or not) will receive a discount card worth a % off of the price of wings at all "HangOuts" nationwide.

Selected members will receive free food and discount offers periodically via email.

Weekly winners will receive promotional clothing items free.

Each month, the four previous weekly winners will compete for a prize.

Each calendar quarter the twelve previous weekly winners will compete for a prize.

Each month, each calendar quarter, and again annually, all members who have submitted one or more entry (winner or not) since the beginning of the period of time listed will be eligible in a random blind drawing for a prize. Their chances of winning this drawing will be directly proportional to the number of entries they submitted during the month.

Program Apparatus:

Refer to FIGS. 1-24 and the associated descriptions.

The possible embodiments of the apparatus and method described herein are exemplary and numerous modifications, combinations, variations, and rearrangements can be readily envisioned to achieve an equivalent result, all of which are intended to be embraced within the scope of the appended claims. Further, nothing in the above-provided discussions of the apparatus and method should be construed as limiting the invention to a particular embodiment or combination of embodiments. The scope of the invention is best defined by the appended claims.

We claim:

1. Apparatus for utilizing food residue, the apparatus positionable upon a horizontal support surface, the apparatus comprising:
    a base, said base having a connective member;
    a food residue-receiving container having a first end and an opposite second end;
    said first end of said food residue-receiving container selectively connectable to said connective member, so that when said base is positioned upon the horizontal support surface said food residue-receiving container is disposed above said base;
    said food residue-receiving container having an internal cavity which has a length and a maximum transverse dimension;
    a scale which is shaped and dimensioned to be longitudinally inserted into said internal cavity; and,
    said scale being flexible and having a width which is greater than said maximum transverse dimension of said internal cavity, so that when said base and said food residue-receiving container are positioned upon the horizontal support surface and said scale is inserted into said internal cavity said scale is vertically oriented in said internal cavity and bows.

2. Apparatus for utilizing food residue, the apparatus positionable upon a horizontal support surface, the apparatus comprising:
    a base, said base having a connective member;
    a food residue-receiving container having a first end and an opposite second end;
    said first end of said food residue-receiving container selectively connectable to said connective member, so that when said base is positioned upon the horizontal support surface said food residue-receiving container is disposed above said base;
    a second food residue-receiving container which is structurally identical to said food residue-receiving container;
    said second end of said food residue-receiving container selectively connectable to said first end of said second food residue-receiving container, so that said second food residue-receiving container and said food residue-receiving container can be placed in stacked vertical relationship;
    said food residue-receiving container including a circular tube;
    said first end of said food residue-receiving container including one of a female threaded connector and a male threaded connector;
    said second end of said food residue-receiving container and said connective member each including the other of said female threaded connector and said male threaded connector;
    said food residue-receiving container having an internal cavity which has a length and a maximum transverse dimension;
    a scale which is shaped and dimensioned to be longitudinally inserted into said internal cavity;
    said scale having a scale length which is less than said length of said internal cavity; and,
    said scale being flexible and having a width which is greater than said maximum transverse dimension of said internal cavity, so that when said base and said food residue-receiving container are positioned upon the horizontal support surface and said scale is inserted into said internal cavity said scale is vertically oriented in said internal cavity and bows.

3. A method for utilizing food residue, comprising:
    (a) providing a horizontal support surface;
    (b) providing food which when eaten produces food residue;
    (c) providing apparatus for utilizing said food residue, said apparatus including:
        a base, said base having a connective member;
        at least one food residue-receiving container having a first end, an opposite second end, and an internal cavity;
        said first end of said food residue-receiving container selectively connectable to said connective member;
        a scale for measuring a height of said food residue;
    (d) connecting said first end of said food residue-receiving container to said connective member;
    (e) positioning said base upon said horizontal support surface so that said food residue-receiving container is disposed above said base;
    (f) eating said food and producing said food residue;
    (g) as said food residue is produced in (f), depositing said food residue into said food residue-receiving container;
    (h) stopping said eating of (f) and said depositing of (g);
    (i) using said scale to measure a height of said food residue;
    in (c), said scale shaped and dimensioned to be longitudinally inserted into said internal cavity;
    in (c), said internal cavity having a maximum transverse dimension, and said scale being flexible and having a width which is greater than said maximum transverse dimension of said internal cavity, and,
    in (i), inserting said scale into said internal cavity wherein said scale is vertically oriented in said internal cavity and bows.

4. A method for utilizing food residue, comprising:
    (a) providing a horizontal support surface;
    (b) providing food which when eaten produces food residue;
    (c) providing apparatus for utilizing said food residue, said apparatus including:
        a base, said base having a connective member;
        at least one food residue-receiving container having a first end, an opposite second end, and an internal cavity;
        said first end of said food residue-receiving container selectively connectable to said connective member;
        a scale for measuring a height of said food residue;

(d) connecting said first end of said food residue-receiving container to said connective member;
(e) positioning said base upon said horizontal support surface so that said food residue-receiving container is disposed above said base;
(f) eating said food and producing said food residue;
(g) as said food residue is produced in (f), depositing said food residue into said food residue-receiving container;
(h) stopping said eating of (f) and said depositing of (g);
(i) using said scale to measure a height of said food residue;
after (i), dividing said height of said food residue by a number of participating individuals in (f) and (g) to arrive at an average score; and,
comparing said average score with an average score of other competing participants, and awarding a prize for the highest average score.

* * * * *